(No Model.)
D. C. D. WHITCOMB.
FACE WHEEL OR CRANK DISK.
No. 435,576. Patented Sept. 2, 1890.
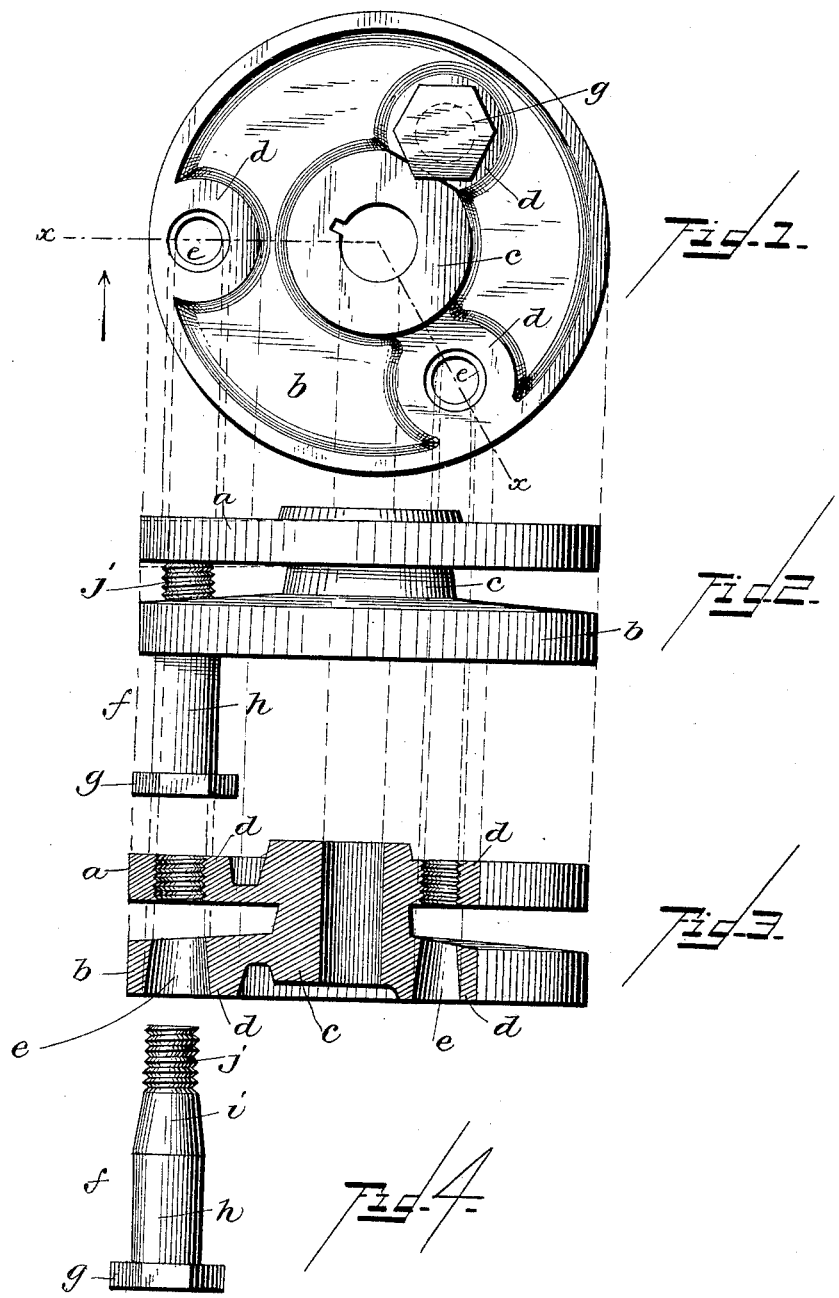
WITNESSES
F. L. Ourand
E. A. Fincuel
INVENTOR.
Daniel Curtis Dwight Whitcomb
by W. H. Fincuel
his Attorney

UNITED STATES PATENT OFFICE.

DANIEL CURTIS DWIGHT WHITCOMB, OF HOLDREGE, NEBRASKA, ASSIGNOR TO THE HOLDREGE MANUFACTURING COMPANY, OF SAME PLACE.

FACE-WHEEL OR CRANK-DISK.

SPECIFICATION forming part of Letters Patent No. 435,576, dated September 2, 1890.

Application filed May 26, 1890. Serial No. 353,225. (No model.)

*To all whom it may concern:*

Be it known that I, DANIEL CURTIS DWIGHT WHITCOMB, a citizen of the United States, residing at Holdrege, in the county of Phelps and State of Nebraska, have invented a certain new and useful Improvement in Face-Wheels or Crank-Disks, of which the following is a full, clear, and exact description.

The object of this invention is to provide a face-wheel or crank-disk to which the wrist-pin may be readily attached without extraneous nuts and be held securely in place and be capable of ready removal.

The invention consists in a face-wheel or crank-disk having an inner and an outer flange and a hub, the outer flange being reamed out tapering and the inner flange being screw-tapped to receive a tapered and threaded wrist-pin, substantially in the manner hereinafter more particularly set forth and finally claimed.

In the accompanying drawings, illustrating my invention, in the several figures of which like parts are similarly designated, Figure 1 is an elevation; Fig. 2, a plan; Fig. 3, a section taken in the plane of line *x x*, Fig. 1, looking in the direction of the arrow; and Fig. 4, a plan of the wrist-pin detached.

My improved face-wheel or crank-disk, as shown, has an inner flange *a* and an outer flange *b* and a hub *c*, common to both. In practice the most economical and convenient manner of constructing these parts will be by casting them as an integer, although I do not limit the invention to that particular mode of producing the said face-wheel or crank-disk. I prefer to provide a series of bosses *d*, arranged eccentrically on the outer faces of both flanges. These bosses are arranged at different distances from the center of the face-wheel, so as to provide for adjustment of the wrist-pin, in order to obtain different lengths of stroke. The bosses in the outer flange are provided with tapered holes *e*, and the bosses in the inner flange are screw-tapped. These threads may be either right or left hand, as desired.

The wrist-pin *f* is provided with a head *g*, a cylindrical shank *h*, a tapered portion *i*, and a cylindrical screw-threaded portion *j*.

As is well known, there is a certain amount of resilience in cast metal, and I make use of this resilience in the inner flange in the following manner: When the wrist-pin is to be inserted, the inner flange is deflected, by cramping or otherwise, toward the outer flange, as indicated in dotted lines at the left-hand side of Fig. 2, and the wrist-pin is then inserted first through the tapered opening *e* in the outer flange and then screwed into the boss in the inner flange. When the wrist-pin has been screwed in as far as possible, the cramps are removed, and the inner flange immediately assumes, by virtue of its resilience, its parallelism with the outer flange, and thereby draws the tapered portion of the wrist-pin into its tapered opening *e*, and so binds the same and makes a very close and tight joint or fit.

In operation the tendency of the flanges to separate incident to the revolving of the wheel would tend, further, to draw the wrist-pin into its tapered socket *e*, and thereby continually tighten the connection of the wrist-pin with the face-wheel. The inner flange takes the place of a nut, which latter offers no lateral resistance to the pin, while the inner flange, being made solid on the hub with the outer flange, resists all lateral pressure. Moreover, the use of the two flanges furnishes the longest possible bearing for the wrist-pin that can be had. By providing the space between the inner and outer flanges still another advantage is gained, in this, that the wrist-pin is prevented from wearing out its bearing. If the wheel were made solid and a hole bored clear through the same to receive the wrist-pin and the wrist-pin secured by a nut, then in use, by the inevitable loosening of the nut and by the strain of the pitman, the wrist-pin would begin to work loose and would soon wabble in its seat and wear out or ream out the said seat and cut itself and soon destroy both wrist-pin and wheel. This cannot occur where the wheel is made with inner and outer flanges and a nut is dispensed with, as is obvious, and for the reasons already stated.

The face-wheel or crank-disk shown in the drawings is one specially designed for use on the wheel-shaft of windmills, the wrist-pin being designed to receive the pitman, which is connected to the working-rod; but, of course, I do not limit my invention to a face-wheel or crank-disk for this purpose or for any special purpose, the invention being designed for face-wheels, crank-disks, or crank-wheels for use generally.

What I claim is—

1. A face-wheel or crank-disk composed of an inner flange and an outer flange and a connecting-hub, with an annular space separating the two flanges, the outer flange being reamed out and the inner flange being screw-tapped to receive and secure the wrist-pin, substantially as described.

2. A face-wheel or crank disk or wheel composed of an outer flange and an inner flange and a hub, all made as an integer, the two flanges being separated by an annular space and the outer flange being reamed out and the inner flange being screw-tapped to receive and secure the wrist-pin, substantially as described.

3. A face-wheel or crank disk or wheel composed of an inner flange and an outer flange and a hub uniting the two, with an annular space between the said flanges, the outer flange being provided with a tapered opening and the inner flange with a screw-tapped opening, combined with a wrist-pin having a cylindrical shank, a tapered portion, and a screw-threaded portion, substantially as and for the purpose described.

4. A face-wheel or crank disk or wheel composed of an inner and an outer flange and a hub uniting the two, with an annular space between the two flanges, the inner flange being sufficiently resilient to enable it to be sprung toward the outer flange, so that when the wrist-pin is inserted through the outer flange into and secured in the inner flange the said inner flange is free to recover its normal position and draw the wrist-pin securely to its seat in the outer flange, substantially as described.

In testimony whereof I have hereunto set my hand this 13th day of May, A. D. 1890.

DANIEL CURTIS DWIGHT WHITCOMB.

Witnesses:
C. W. LEACH,
A. N. KING.